United States Patent [19]

Damm et al.

[11] Patent Number: 5,368,398
[45] Date of Patent: Nov. 29, 1994

[54] DIAMOND BEARING ASSEMBLY

[75] Inventors: Oliver F. R. A. Damm; Klaus Tank, both of Transvaal, South Africa

[73] Assignee: CSIR, Transvaal, South Africa

[21] Appl. No.: 142,042

[22] Filed: Oct. 28, 1993

[30] Foreign Application Priority Data

Oct. 28, 1992 [ZA] South Africa .................. 92/8328
Oct. 28, 1992 [ZA] South Africa .................. 92/8329
Oct. 28, 1992 [ZA] South Africa .................. 92/8330

[51] Int. Cl.⁵ .................................................. F16C 17/04
[52] U.S. Cl. ................................... 384/304; 384/420; 384/907.1
[58] Field of Search ............... 384/304, 420, 907.1, 384/424, 913, 317

[56] References Cited

U.S. PATENT DOCUMENTS

| | | |
|---|---|---|
| 4,410,054 | 10/1983 | Nagel et al. |
| 4,468,138 | 8/1984 | Nagel . |
| 4,560,014 | 12/1985 | Geczy . |
| 4,620,601 | 11/1986 | Nagel . |
| 4,662,348 | 5/1987 | Hall et al. |
| 4,708,496 | 11/1987 | McPherson . |
| 4,729,440 | 3/1988 | Hall . |
| 4,802,539 | 2/1989 | Hall et al. |
| 5,092,687 | 3/1992 | Hall . |

FOREIGN PATENT DOCUMENTS

| | | |
|---|---|---|
| 0198112 | 10/1986 | European Pat. Off. |
| 0283982 | 9/1988 | European Pat. Off. |
| 2916347 | 10/1980 | Germany . |
| WO87/07343 | 12/1987 | WIPO . |

OTHER PUBLICATIONS

Superabrasives '91, Jun. 1991, Monte Russell, "The Use of Polycrystallien Diamond (PCD) Drilling Compacts as Bearing Components in Downhole Drilling Motors Used in Petroleum Rock Drilling and Other Possible Uses", pp. 18–19 to 18–38.

"Polycrystalline Diamond Creates Superior Thrust Bearings", Scott L. Hormann, Sep. 1991, pp. 15, 16 and 24.

Primary Examiner—Lenard A. Footland
Attorney, Agent, or Firm—Oblon, Spivak, McClelland, Maier & Neustadt

[57] ABSTRACT

The invention concerns a diamond bearing assembly for a downhole motor. The assembly (10) includes at least one set of opposing, relatively rotating thrust bearing rings (20, 22) each of which includes an annular support element (24, 30) and PCD compacts (26, 32) carried by the support elements. The PCD compacts of the bearing rings oppose one another at a thrust bearing interface (80). Shear limiting means (96, 110) are provided. These means are arranged to shear if frictional forces between the opposing PCD compacts at the thrust bearing interface exceed a critical level. This eliminates relative rotation between the bearing rings and avoids possible overheating and thermal degradation of the PCD. The shear limiting means can also serve as an alignment means to ensure correct axial alignment of the bearing components. The bearing assembly may also include a compact radial bearing capability.

16 Claims, 4 Drawing Sheets

DIAMOND BEARING ASSEMBLY

BACKGROUND TO THE INVENTION

This invention relates to a self-aligning diamond thrust bearing assembly. The invention relates furthermore to a combination bearing assembly having both thrust and radial bearing capabilities.

One application of the diamond bearing assembly of the invention is in a downhole motor as used in the drilling industry. Conventional thrust bearing assemblies as employed in downhole drilling motors use rolling element bearings or plain bearings. In the case of a plain bearing, steel thrust rings slide on elastomeric pads, and such bearings are usually arranged in stacks to take the imposed axial thrust. One disadvantage of stacked bearings of this kind is the fact that the bearing assembly has a considerable length, rendering it unsuitable for negotiating tight bends in directional drilling applications.

A further disadvantage, suffered both by roller bearings and plain bearings, arises from the fact that the bearing assembly is exposed in use to the drilling fluid or mud that powers the motor. The abrading action of the fluid on the bearing components wears them out rapidly, necessitating frequent replacement or refurbishment and considerable downtime.

For these reasons, it has been proposed to employ diamond compacts as thrust bearing components, since it is recognised that such components will generate relatively low frictional forces and have the ability to withstand high thrust loads.

SUMMARY OF THE INVENTION

According to the invention there is provided a diamond bearing assembly for a downhole motor, the assembly comprising:
  at least one set of opposing, relatively rotating thrust bearing rings each of which includes an annular support element and a plurality of PCD compacts carried by the support element, the PCD compacts of the bearing rings opposing one another at a thrust bearing interface; and
  a backing ring located axially adjacent one of the bearing rings of the set; and
  resilient alignment means interposed between the backing ring and the adjacent bearing ring, the alignment means having axial projections on opposite faces thereof which engage with the backing and bearing rings, thereby to hold those rings resiliently in axial alignment with one another.

In this specification, "PCD" refers to polycrystalline diamond. "PCD compact" refers to a polycrystalline diamond compact which consists of a mass of diamond particles, generally present in an amount of more than 70% by volume of the compact, bonded under diamond synthesis conditions. The compact may have a second phase which can optionally contain or consist of a diamond solvent/catalyst. "Composite PCD compact" or "composite compact" refers to a PCD compact on a cemented carbide or other suitable substrate.

The backing ring may be fixed rotationally to a driveshaft of the downhole motor.

In one version of the invention, the resilient alignment means comprises an insert which includes an annular disc from which axial projections in the form of angularly spaced pins project in opposite axial directions, the pins locating in pockets in the backing ring and in the adjacent bearing ring. Typically in this version of the invention, the disc and pins are formed in one piece from a polymeric plastics material, such as PTFE. In some cases, the pins which project in one axial direction are aligned with the pins which project in the opposite direction, while in other cases, the pins which are project in one axial direction are circumferentially offset from the pins which project in the opposite direction.

In another version of the invention, the resilient alignment means comprise by a rigid annular disc through which axial projections in the form of angularly spaced pins are received with the ends of the pins projecting in opposite axial directions from the annular disc, the pins locating in pockets in the backing ring and in the adjacent bearing ring and there being an elastic disc or washer interposed between the annular disc and the backing ring so that there is resilience between the pins and the backing ring. In this version, the pins may be made of steel with the elastic disc or washer made of rubber.

According to a preferred feature, the pins of either version of the invention can be adapted to shear if frictional forces between opposing PCD compacts at the thrust bearing interface should exceed a critical level, thereby to eliminate relative rotation between the bearing rings.

There may be two sets of bearing rings, the backing ring being located between the two sets. Also there may be at least one radial bearing ring presenting a bearing surface that runs, at a radial bearing interface, against an opposing bearing surface presented by an annular support element of a thrust bearing ring. The radial bearing ring is typically adapted to be mounted fast on the driveshaft of a downhole motor.

Further according to the invention, there is provided a downhole motor comprising a diamond bearing assembly as summarised above.

BRIEF DESCRIPTION OF THE DRAWINGS

The invention will now be described in more detail, by way of example only, with reference to the accompanying drawings in which.

DESCRIPTION OF EMBODIMENTS

Figure 1:
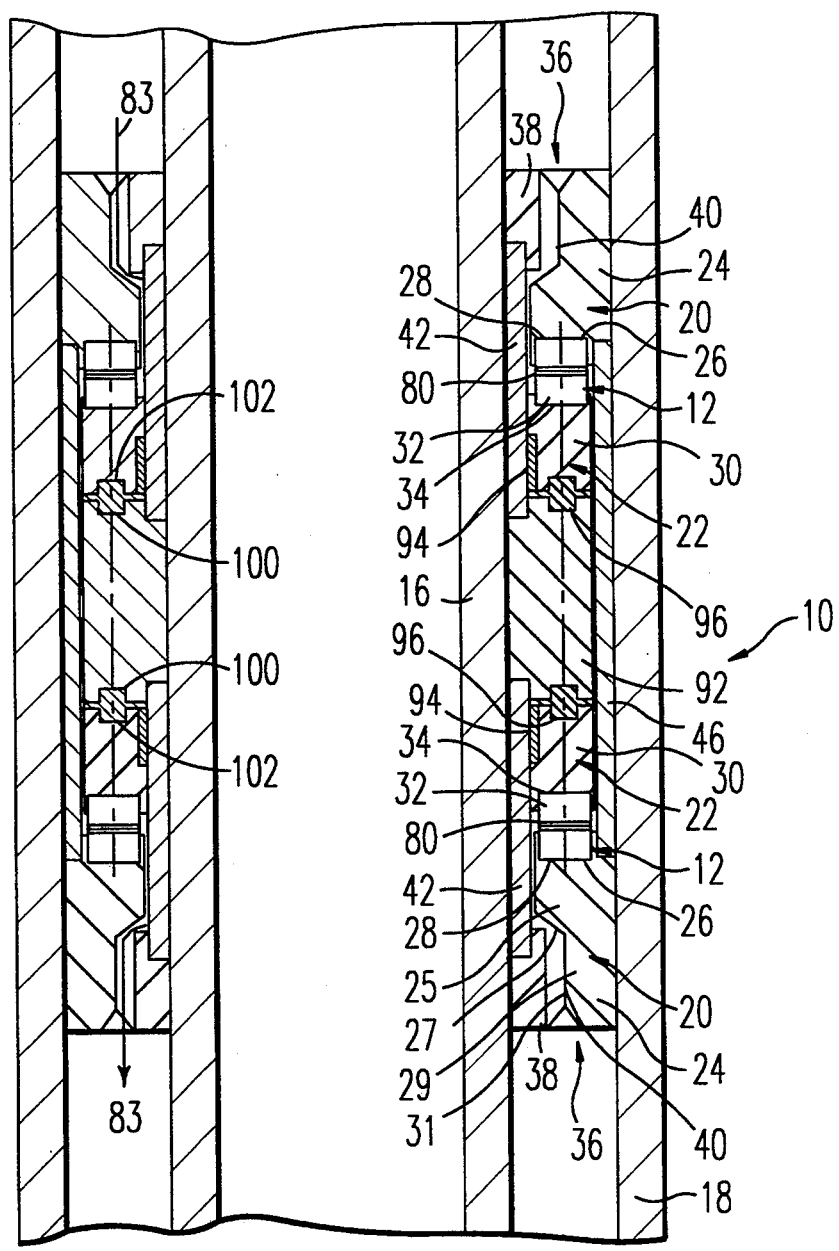
FIG. 1 illustrates the general arrangement of a first bearing assembly of the invention.

FIG. 1 illustrates the general arrangement of one embodiment of downhole motor bearing assembly 10 which incorporates two diamond thrust bearing assemblies 12. There is a central tubular downhole motor driveshaft 16 located rotatably within a tubular bearing housing 18, with the downhole motor bearing assembly 10 located and providing for relative rotation between the shaft and housing. Components above and below the actual bearing assembly 10 are not illustrated. Those skilled in the art will nevertheless recognise that the driveshaft 16 is rotated by the action of drilling fluid in the downhole motor, and supplies rotary drive to a drill bit. The housing 18 remains stationary.

The diamond thrust bearing assemblies 12 are provided by a pair of outer bearing rings 20 and a pair of inner bearing rings 22. Each outer bearing ring 20 is composed of an annular, sintered tungsten carbide support element 24 and a series of composite PCD compacts 26 which are located and secured in complemental pockets 28 formed in an end surface of the element 24.

Each inner bearing ring 22 is composed of an annular sintered tungsten carbide support element 30 and a series of composite PCD compacts 32 which are located and secured in complemental pockets 34 formed in an end surface of the element.

The composite compacts 26 and 32 may have any suitable shape. In a preferred version of the invention, each of the composite compacts 26 has a round cylindrical shape while each of the composite compacts 32 has an elongate, part-annular shape. In practice in this version of the invention, the circumferential length of each composite compact 32 will be substantially greater than the diameter of a composite compact 26, the arrangement being such that there is always full bearing contact between at least one of the composite compacts 26 and a composite compact 32.

The assembly 10 also includes two radial bearing assemblies, indicated generally with the numeral 36. Each of these assemblies includes a rotating radial bearing ring 38 of cemented tungsten carbide which runs, at a bearing interface 40, against a portion of the support element 24 of an outer bearing ring 20.

As seen in cross-section in FIG. 1, each support element 24 has a relatively thicker portion 25, a taper shoulder 27 and a rebated portion 29. The portion 29 presents a round cylindrical radial bearing surface 31. As stated above, the bearing ring 20 is fast with the housing 18 and the support element 24 accordingly does not rotate during operation of the bearing assembly 10.

Figure 4:
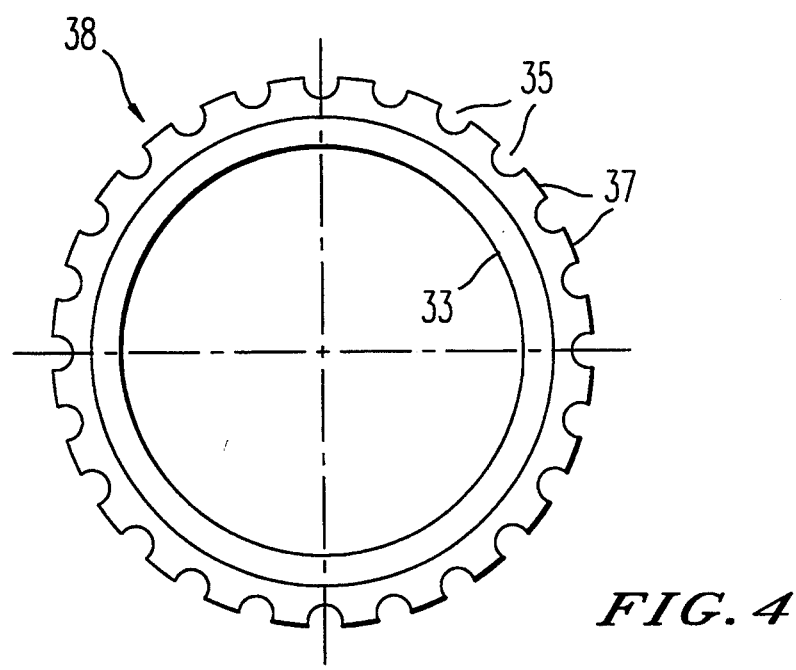
FIG. 4 illustrates a radial bearing ring.
Figure 5:
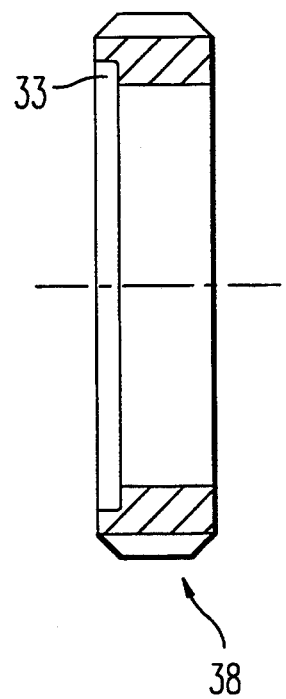
FIG. 5 shows a cross-section through the radial bearing ring seen in FIG. 4.

FIGS. 4 and 5 illustrate the radial bearing ring 38 which is fast with the driveshaft 16 and which accordingly rotates with the driveshaft. The radial bearing ring 38 is formed in one piece of cemented tungsten carbide. It is formed with a rebate 33 which receives an end of the relevant, radially inner spacer ring 42. The radially outer surface of the radial bearing ring 38 has the illustrated, regular scalloped profile. The scallops 35 are in this case spaced apart from one another by 15° and have a maximum radial depth of approximately 8 mm. In practice, the scallops 35 will have a size designed to produce a desired pressure drop in the drilling fluid across the bearing. The peripheral portions 37 of the ring 38 between the scallops present a cylindrical radial bearing surface which opposes and runs against the bearing surface 31.

In operation of the bearing assembly 10 as described above, drilling fluid follows the route indicated by the arrow 83 in FIG. 1. It will be noted that the drilling fluid passes sequentially through the upper radial bearing assembly 36, through the upper thrust bearing assembly 12, through the lower thrust bearing assembly 12 and finally through the lower radial bearing assembly 36, whereafter it travels downwardly to the region of the drilling bit to assist in the drilling operation.

It will be recognised that the drilling fluid, in traversing the upper and lower radial bearing assemblies 36, passes through the scallops 35 of the radial bearing rings 38. In doing so, the drilling fluid applies a cooling and lubricating effect to the radial bearing rings 38 and the thrust bearing rings 20 and to the bearing interface 40.

During normal operation of the bearing assembly 10, the diamond thrust bearing assemblies 12 take all axial thrust imposed on the driveshaft, with the radial bearing assemblies 36 being provided to take any radial forces that may arise through directional deviations during drilling. Since the radial loads will in practice be of smaller magnitude than the thrust loads, it is considered sufficient for the radial bearing components to be made of carbide material as opposed to diamond. In practice, there will usually be a small clearance between the bearing surfaces in the radial bearing assemblies, so that these bearing assemblies only come into play in the event of directional deviations.

Of course, the radial bearing assemblies also serve the important function of maintaining correct alignment of the driveshaft 16 in the housing 18.

To enable the radial bearing assemblies to perform adequately in the role of maintaining correct alignment of the driveshaft 16 in the housing 18, it is anticipated that they may need to be extremely robust in design and possibly of larger dimensions than would be apparent from FIG. 1.

Referring again to FIG. 1, it will be appreciated that the overall axial length of the combination bearing assembly 10 is relatively short, thereby enhancing the ability of the downhole motor and associated drilling components to undergo, relatively sharp changes in direction during directional drilling.

The short overall length of the combination bearing assembly 10 can be attributed to two factors. Firstly, the use of diamond thrust bearings, which can take extremely high thrust loads, means that only a small number, in this case two, thrust bearing assemblies are necessary. Secondly, in each radial bearing assembly 36, one of the thrust bearing rings, i.e. the ring 20, serves both as a thrust bearing component and as a radial bearing component, thus limiting the number of axially aligned components.

The assembly 10 also includes radially inner spacer rings 42, a radially outer spacer ring 46 and a central assembly comprising a central backing ring 92, plastics spacer rings 94 and a pair of alignment inserts 96. In practice, an axial compressive force is applied by external locknuts (not illustrated) to the radially outer components of the assembly 10, i.e. to the bearing rings 20 and the spacer ring 46. The applied compressive force locks the bearing rings 20 and spacer ring 46 frictionally to one another and to the stationary bearing housing 18. These components thus form a stator.

At the same time, locknuts apply an axial compressive force to the radially inner components of the assembly 10, i.e. to the radial bearing rings 38, spacer rings 42 and central backing ring 92. In this case, the applied compressive force locks the components 38, 42 and 92 frictionally to one another and to the driveshaft 16, so that when the driveshaft is rotated by the action of the motor, these components rotate with it. These components thus form a rotor of the bearing assembly.

The composite PCD compacts 26 and 32 present PCD compacts at flat bearing surfaces which run against one another in operation at bearing interfaces 80, taking the axial thrust applied to the shaft 16. Because of their diamond nature, these surfaces have a very low coefficient of friction and are extremely hard, enabling them to take large axial loading without undue damage.

The bearing interfaces 80 are cooled and lubricated during operation by drilling fluid or mud which is exhausted from the downhole motor and which flows axially down the assembly and radially through gaps between the composite compacts 26 and 32 in the bearing rings, as indicated by the arrow 83.

The central backing ring 92 spaces the inner thrust bearing rings 22 apart from one another. The ring 92 may be made of steel, typically EN24 steel, or of tungsten carbide. The spacer rings 94 and alignment inserts 96 are typically made of PTFE or of glass-reinforced nylon.

Figure 2:
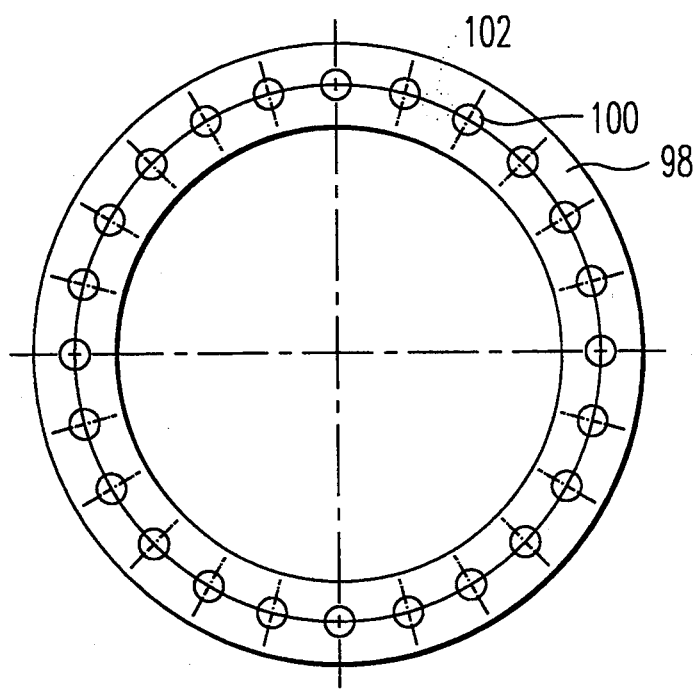
FIG. 2 shows a face view of an alignment insert used in the bearing assembly seen in FIG. 1.

Referring to FIG. 2, each insert 96 includes an annular disc 98 with a series of angularly spaced alignment pins 100 and 102 projecting axially therefrom in opposite directions. The pins 100 locate in pockets formed in the ends of the central backing ring 92 and the pins 102 locate in pockets formed at the relevant ends of the support elements 30 of the inner thrust bearing rings 22.

In this embodiment, the pins 100 and 102 are in axial alignment with one another, i.e. directly opposite one another on opposite sides of the disc 98. In other embodiments, the pins 100 on one side of the disc 98 may be off-set from the pins 102 on the other side of the disc, for instance by a half-pitch as illustrated by the broken line representation of a pin 102 in FIG. 2.

The inserts 96 serve an important alignment function, in that the location of the pins 100 and 102 in their respective pockets will ensure correct axial alignment of the components. In addition to this, the inserts 96 are made of material which has a degree of inherent resilient flexibility. This flexibility enables them to take account of minor misalignments between the respective components, possibly arising as a result of minor manufacturing inaccuracies. Misalignments can also arise between the driveshaft 16 and the bearing housing 18 as a result of wear of the radial bearings.

Additionally, the resiliently flexible nature of the inserts 96 enables them to serve a valuable shock absorbing or damping function in the event of sudden variations in the axial loading applied to the bearing assembly. By damping such variations, sudden shock axial loads on, and damage to, the bearing rings can be reduced.

In normal operation, the alignment inserts 96 transmit torque from the rotating shaft 16 to the inner bearing rings 22, so that the inner bearing rings rotate with the shaft.

However, if the frictional force generated by the action of the PCD compacts running against one another at the interfaces 80 exceeds a certain critical level, at which there is a danger of the bearings overheating and seizing, and of the expensive PCD compacts being damaged, the pins 100 and 102 will shear off the disc 98. This flees the inner bearing rings 22 from the shaft and eliminates rotation between the inner and outer bearing rings. Thus a further important function of the inserts 96 is to act in a shear limiting role to prevent excessive and possibly damaging torque at the bearing interface.

Figure 3:
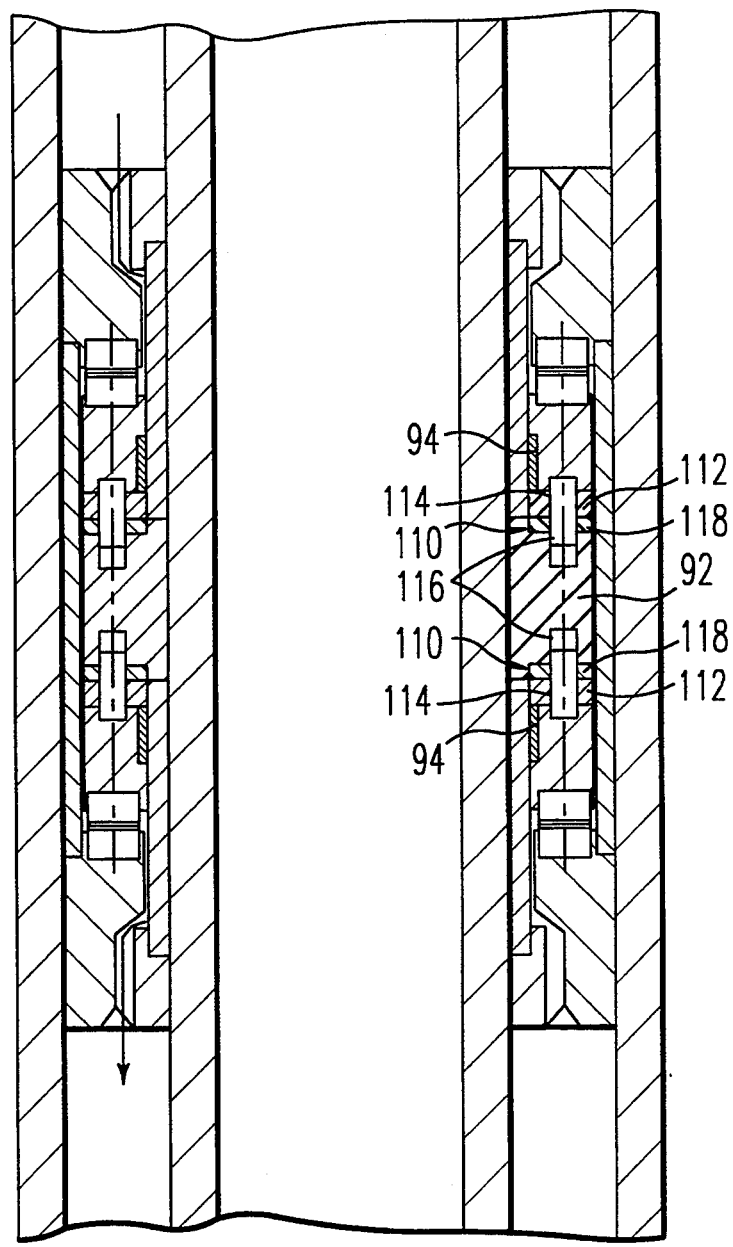
FIG. 3 illustrates the general arrangement of a second bearing assembly of the invention.

Reference is now made to FIG. 3 which illustrates the general arrangement of a second embodiment of the invention. Components corresponding to those in FIG. 1 are designated with the same reference numerals.

In FIG. 3, there is once again a central backing ring 92 and plastics spacing rings 94, but in this case the plastics inserts 96 are replaced by alignment assemblies 110.

Each alignment assembly 110 includes an annular steel disc 112 through which angularly spaced bores 114 are formed, a series of steel pins 116 passing through the bores 114, and an annular, elastomeric disc or washer 118. The pins 116 are brazed or otherwise fixed in the bores 114. The disc 118 is typically made of rubber and is vulcanised between the steel disc 112 and the steel backing ring 92. Thus the backing ring 92 and the assemblies 110 form a unitary component with the pins somewhat resiliently mounted relative to the central backing ring 92.

The inner thrust bearing rings in FIG. 3 are identical to the inner bearing rings of FIG. 1. The projecting ends of the pins 116 locate quite loosely in pockets in the central backing ring 92 and in the inner bearing rings 22.

As in the case of the plastics inserts 96, the assemblies 110 serve an important axial alignment function, with the resilient nature of the rubber discs 118 enabling the assemblies 110 to take account of minor misalignments between the components.

In addition, the resilient nature of the rubber discs 118 enables them to serve a shock absorbing function in the event of sudden variations in the axial load carried by the bearing assembly. To enable them to serve this function it is anticipated that rubber with a Shore hardness of around 80 to 85, and a thickness of 4 mm to 5 mm, will be adequate.

As in the first embodiment, the pins 116 can also serve a shear limiting or torque overload protection function. If friction at the bearing interface 80 becomes excessive, with the attendant danger of seizure of the thrust bearing assemblies, the pins 116 will shear off to release the inner bearing rings from the central backing ring 92 and from the driveshaft 16. In this case, with shear pins 116 made of steel, a higher torque will be necessary before shearing of the pins takes place than in the case of PTFE inserts 96.

It will be noted that the FIG. 3 embodiment also includes radial bearing assemblies 36 similar to those in FIG. 1. In other embodiments of the invention, the radial bearing assemblies 36 could be replaced or supplemented by radial bearings which are totally separate and spaced away from the thrust bearings.

The tungsten carbide support elements of the bearing rings could, in other embodiments, be replaced by steel rings. In such cases, the steel rings could be provided with corrosion resistant coatings, such as thermally sprayed tungsten carbide, a ceramic or other hard material. Alternatively, the steel rings could be surface treated, for example by nitriding, to improve corrosion resistance. Although tungsten carbide rings are generally preferred because of their high levels of stiffness and corrosion resistance, steel rings may in certain circumstances be preferable from a cost point of view.

We claim:

1. A diamond bearing assembly for a downhole motor, the assembly comprising:
    at least one set of opposing, relatively rotating thrust bearing rings each of which includes an annular support element and a plurality of PCD compacts carried by the support element, the PCD compacts of the bearing rings opposing one another at a thrust bearing interface; and
    a backing ring located axially adjacent one of the bearing rings of the set; and
    resilient alignment means interposed between the backing ring and the adjacent bearing ring, the alignment means having axial projections on opposite faces thereof which engage with the backing and bearing rings, thereby to hold those rings resiliently in axial alignment with one another.

2. A diamond bearing assembly according to claim 1 wherein the backing ring is fixed rotationally to a driveshaft of the downhole motor.

3. A diamond bearing assembly according to claim 2 wherein the resilient alignment means comprises an insert which includes an annular disc from which axial projections in the form of angularly spaced pins project in opposite axial directions, the pins locating in pockets in the backing ring and in the adjacent bearing ring.

4. A diamond bearing assembly according to claim 3 wherein the disc and pins are formed in one piece from a polymeric plastics material.

5. A diamond bearing assembly according to claim 4 wherein the polymeric plastics material is PTFE.

6. A diamond bearing assembly according to claim 5 wherein the pins which project in one axial direction are aligned with the pins which project in the opposite direction.

7. A diamond bearing assembly according to claim 6 wherein the pins which are project in one axial direction are circumferentially off-set from the pins which project in the opposite direction.

8. A diamond bearing assembly according to claim 3 wherein the pins are adapted to shear if frictional forces between opposing PCD compacts at the thrust bearing interface should exceed a critical level, thereby to eliminate relative rotation between the bearing rings.

9. A diamond bearing assembly according to claim 2 wherein the resilient alignment means comprise by a rigid annular disc through which axial projections in the form of angularly spaced pins are received with the ends of the pins projecting in opposite axial directions from the annular disc, the pins locating in pockets in the backing ring and in the adjacent bearing ring and there being an elastic disc or washer interposed between the annular disc and the backing ring so that there is resilience between the pins and the backing ring.

10. A diamond bearing assembly according to claim 9 wherein the pins are made of steel and the elastic disc or washer is made of rubber.

11. A diamond bearing assembly according to claim 8 wherein the pins are adapted to shear if frictional forces between opposing PCD compacts at the thrust bearing interface should exceed a critical level, thereby to eliminate relative rotation between the bearing rings.

12. A diamond bearing assembly according to claim 2 comprising two sets of bearing rings, the backing ring being located between the two sets.

13. A diamond bearing assembly according to claim 2 comprising at least one radial bearing ring presenting a bearing surface that runs, at a radial bearing interface, against an opposing bearing surface presented by an annular support element of a thrust bearing ring.

14. A diamond bearing assembly according to claim 13 wherein the radial bearing ring and the annular support elements of the thrust bearing rings are made of sintered tungsten carbide.

15. A diamond bearing assembly according to claim 14 wherein the radial bearing ring has an outer surface which is scalloped at angularly spaced apart locations.

16. A diamond bearing assembly according to claim 15 wherein the radial bearing ring is adapted to be mounted fast on the driveshaft of a downhole motor.

* * * * *